(12) United States Patent
Fitzpatrick (10) Patent No.: US 11,526,350 B2
(45) Date of Patent: Dec. 13, 2022

(54) PROVIDING CODE EDITOR DOCUMENTATION PAGES USING A LIGHTWEIGHT TEXT FORMATTING LANGUAGE AND PLATFORM-AGNOSTIC COMMAND LINKS

(71) Applicant: Red Hat, Inc., Raleigh, NC (US)

(72) Inventor: Brian T. Fitzpatrick, Denver, CO (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/822,287

(22) Filed: Mar. 18, 2020

(65) Prior Publication Data

US 2021/0294599 A1  Sep. 23, 2021

(51) Int. Cl.
  *G06F 9/44* (2018.01)
  *G06F 9/445* (2018.01)
  *G06F 8/73* (2018.01)
  *G06F 8/34* (2018.01)

(52) U.S. Cl.
  CPC . *G06F 8/73* (2013.01); *G06F 8/34* (2013.01)

(58) Field of Classification Search
  CPC .................................. G06F 8/73; G06F 8/34
  See application file for complete search history.

(56) References Cited

U.S. PATENT DOCUMENTS

| | | |
|---|---|---|
| 7,657,873 B2 | 2/2010 | Horton et al. |
| 7,984,384 B2 | 7/2011 | Chaudhri et al. |
| 8,930,891 B2 | 1/2015 | Ge |
| 9,459,780 B1 * | 10/2016 | Smith ............... G06F 9/453 |
| 2012/0324418 A1 | 12/2012 | Fallon |

(Continued)

FOREIGN PATENT DOCUMENTS

| | | | |
|---|---|---|---|
| CN | 109726379 A | * | 5/2019 |
| JP | 2019207527 A | * | 12/2019 |

OTHER PUBLICATIONS

B.J. Keeton, The 11 Best code editors for 2019, 2019, pp. 1-35. https://www.elegantthemes.com/blog/resources/best-code-editors (Year: 2019).*

(Continued)

*Primary Examiner* — Mongbao Nguyen
(74) *Attorney, Agent, or Firm* — Dority & Manning, P.A.

(57) ABSTRACT

Providing code editor documentation pages using a lightweight text formatting language and platform-agnostic command links is disclosed. A code editor may provide a documentation code editor extension that enables developers to provide documentation pages that are defined using a lightweight text formatting language, and that include platform-agnostic command links. When selected by a user, the platform-agnostic command links are parsed by the documentation code editor extension, which then initiates execution of a corresponding command using an application programming interface (API) of the code editor. The platform-agnostic command link may comprise a scheme identifier and one or more attribute-value pairs used to specify a command, a project file path, a source file path, an extension file path, a completion message, an error message, a command text input, and/or a user-provided text input. In this manner, interactive documentation pages may provide command links across multiple platforms.

20 Claims, 7 Drawing Sheets

(56) References Cited

U.S. PATENT DOCUMENTS

| | | | | |
|---|---|---|---|---|
| 2013/0074036 | A1* | 3/2013 | Brandt | G06F 8/33 717/113 |
| 2013/0263086 | A1* | 10/2013 | Carter | G06F 8/33 717/113 |
| 2014/0047413 | A1* | 2/2014 | Sheive | G06F 8/30 717/110 |
| 2014/0359571 | A1* | 12/2014 | Sasikumar | G06F 8/33 717/110 |
| 2017/0344227 | A1* | 11/2017 | Stoicov | H04L 41/22 |
| 2017/0357565 | A1* | 12/2017 | Ledet | G06F 8/73 |
| 2020/0042648 | A1* | 2/2020 | Rao | G06F 8/20 |
| 2020/0110792 | A1* | 4/2020 | Tsabba | G06F 40/14 |
| 2020/0133662 | A1* | 4/2020 | Smith | G06N 3/0445 |
| 2020/0192638 | A1* | 6/2020 | Pezaris | G06F 8/41 |
| 2020/0204458 | A1* | 6/2020 | Masuda | G06F 8/34 |
| 2020/0327116 | A1* | 10/2020 | Perlick | G06F 40/166 |
| 2020/0341777 | A1* | 10/2020 | Kashyn | G06F 11/3636 |
| 2021/0004209 | A1* | 1/2021 | Holt | G06F 8/30 |
| 2021/0264096 | A1* | 8/2021 | Huang | G06F 40/14 |

OTHER PUBLICATIONS

Microsoft, VS Code Extensions that will make your life significantly easier, 2019, pp. 1-7. https://betterprogramming.pub/vs-code-extensions-1da56837dd10?gi=2e23346665a3 (Year: 2019).*

Sahar Mehrpour, Active Documentation: Helping Developers Follow Design Decisions, 2019, pp. 87-94. https://ieeexplore.ieee.org/stamp/stamp.jsp?tp=&arnumber=8818816 (Year: 2019).*

Koehnlein, Jan, "Graphical VS Code Extensions with Eclipse Sprotty", https://www.typefox.io/blog/using-sprotty-in-vs-code-extensions, Dec. 19, 2019, 5 pages.

Author Unknown, "Markdown and VS Code", https://vscode-docs.readthedocs.io/en/stable/languages/markdown/, accessed Mar. 13, 2020, 6 pages.

Author Unknown, "Markdown Extension | Visual Studio Code Extension API", https://code.visualstudio.com/api/extension-guides/markdown-extension, accessed Feb. 6, 2020, 2 pages.

* cited by examiner

PROVIDING CODE EDITOR DOCUMENTATION PAGES USING A LIGHTWEIGHT TEXT FORMATTING LANGUAGE AND PLATFORM-AGNOSTIC COMMAND LINKS

BACKGROUND

Some conventional code editors, such as Microsoft Visual Studio (VS) Code, provide a framework through which the native functionality of the code editor may be augmented by developers using code editor "extensions." However, there is presently no common solution for developers who wish to provide interactive documentation pages that allow the additional functionality provided by code editor extensions to be demonstrated in a dynamic fashion.

SUMMARY

The examples disclosed herein relate to providing code editor documentation pages using a lightweight text formatting language and platform-agnostic command links. In one example, a processor device of a computing device may execute a code editor (e.g., Microsoft Visual Studio (VS) Code, as a non-limiting example) into which a custom documentation code editor extension has been installed. The documentation code editor extension enables developers to provide documentation pages that are defined using a lightweight text formatting language (such as Markdown or AsciiDoc, as non-limiting examples). The documentation pages also include platform-agnostic command links that, when selected by a user, are parsed by the documentation code editor extension (e.g., using a custom click event handler, as a non-limiting example). The documentation code editor extension then initiates execution of a corresponding command using an application programming interface (API) of the code editor. In some examples, the documentation code editor extension may also display a user feedback message upon completion of the corresponding command. Some examples may provide that the platform-agnostic command link comprises a scheme identifier and one or more attribute-value pairs. The one or more attribute-value pairs may be used to specify a command, a project file path, a source file path, an extension file path, a completion message, an error message, a command text input, and/or a user-provided text input. In this manner, interactive documentation pages may be created using existing lightweight text formatting languages, and may provide access to code editor commands using command links across multiple platforms.

In another example, a method for providing code editor documentation pages using a lightweight text formatting language and platform-agnostic command links is provided. The method comprises rendering, using a display device coupled to a computing device comprising a processor device, a documentation page as HTML within a code editor interface of a code editor, wherein the documentation page is defined using a lightweight text formatting language and includes one or more platform-agnostic command links. The method further comprises receiving, via a user input device by a documentation code editor extension executing on the processor device, a selection of a platform-agnostic command link of the one or more platform-agnostic command links. The method also comprises, responsive to receiving the selection of the platform-agnostic command link, parsing, by the documentation code editor extension, the platform-agnostic command link to identify a corresponding command, and initiating, by the documentation code editor extension, execution of the corresponding command via an API of the code editor.

In another example, a computing device is provided. The computing device comprises a memory and a processor device coupled to the memory. The processor device is to render, using a display device, a documentation page as HTML within a code editor interface of a code editor, wherein the documentation page is defined using a lightweight text formatting language and includes one or more platform-agnostic command links. The processor device is further to receive, via a user input device using a documentation code editor extension, a selection of a platform-agnostic command link of the one or more platform-agnostic command links. The processor device is also to, responsive to receiving the selection of the platform-agnostic command link, parse, using the documentation code editor extension, the platform-agnostic command link to identify a corresponding command, and initiate, using the documentation code editor extension, execution of the corresponding command via an API of the code editor.

In another example, a computer program product stored on a non-transitory computer-readable storage medium is provided. The computer program product includes instructions to cause a processor device to render, via a display device, a documentation page as HTML within a code editor interface of a code editor, wherein the documentation page is defined using a lightweight text formatting language and includes one or more platform-agnostic command links. The instructions further cause the processor device to receive, via a user input device using a documentation code editor extension, a selection of a platform-agnostic command link of the one or more platform-agnostic command links. The instructions also cause the processor device to, responsive to receiving the selection of the platform-agnostic command link, parse, using the documentation code editor extension, the platform-agnostic command link to identify a corresponding command, and initiate, using the documentation code editor extension, execution of the corresponding command via an API of the code editor.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, the functionality of some conventional code editors, such as Microsoft Visual Studio (VS) Code, may be extended using a built-in framework that enables the use of code editor "extensions" written by third-party developers. Using code editor extensions, new functionality may be added to the native functionality of the code editor. A developer of a code editor extension may desire to offer users a "walkthrough," or interactive demonstration, of the new functionality provided by the code editor extension. However, because there is presently no common solution for providing interactive documentation pages to allow the additional functionality provided by code editor extension to be demonstrated in a dynamic fashion, the developer often must resort to custom documentation solutions.

One approach employed by some developers involves generating documentation pages that are displayed within a "webview" of the code editor. The webview comprises a viewport within the code editor that can render documentation pages that are defined using Hypertext Markup Language (HTML). While this approach may be adequate for providing static documentation pages, it may not offer a simple way for users to navigate a complex workflow. Instead, the documentation page must be complete and clear enough to "walk" the user through potentially complex interactions with the code editor's interface. Accordingly, a solution that provides documentation pages that can be easily written and formatted and that offers a platform-agnostic mechanism for triggering operations using code editor commands is desirable.

In this regard, examples disclosed herein relate to providing code editor documentation pages using a lightweight text formatting language and platform-agnostic command links. In one example, a code editor (e.g., Microsoft Visual Studio (VS) Code, as a non-limiting example) being executed by a processor device of a computing device includes a custom documentation code editor extension. The documentation code editor extension is configured to enable developers to provide documentation pages that are defined using a lightweight text formatting language (such as Markdown or AsciiDoc, as non-limiting examples). The documentation pages also include platform-agnostic command links that, when selected by a user, are parsed by the documentation code editor extension (e.g., using a custom click event handler, as a non-limiting example). The documentation code editor extension then initiates execution of a corresponding command using an application programming interface (API) of the code editor. As used herein, the phrase "platform-agnostic" refers to the fact that, because the command links are parsed and interpreted by the documentation code editor extension itself to initiate execution of the corresponding command, the command links are not dependent on a particular operating system to execute.

In some examples, the documentation code editor extension may also display a user feedback message upon completion of the corresponding command. Some examples may provide that the platform-agnostic command link comprises a scheme identifier and one or more attribute-value pairs. The one or more attribute-value pairs may be used to specify a command, a project file path, a source file path, an extension file path, a completion message, an error message, a command text input, and/or a user-provided text input.

Figure 1:
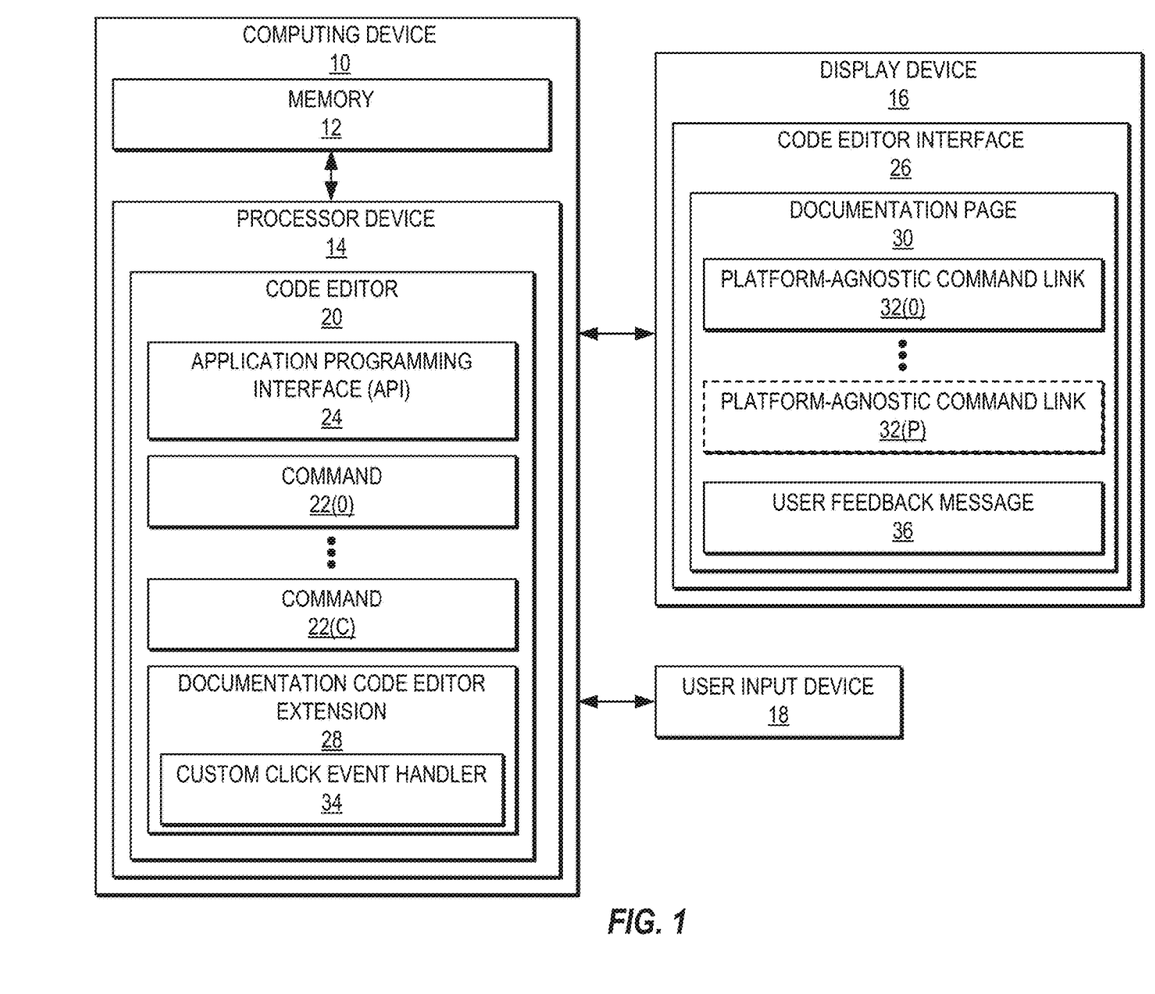
FIG. 1 is a block diagram of a computing device in which examples may be practiced.

In this regard, FIG. 1 provides a computing device 10 that includes a memory 12 and a processor device 14. The computing device 10 is communicatively coupled to a display device 16, which may comprise a monitor, a cathode ray tube (CRT) display, or the like, as non-limiting examples. The computing device 10 is also communicatively coupled to a user input device 18, which may comprise a keyboard, a mouse, a trackpad, and/or the like, as non-limiting examples. It is to be understood that, while the display device 16 and the user input device 18 are illustrated in FIG. 1 as elements separate from the computing device 10, in some examples the display device 16 and the user input device 18 may be physically integrated into the computing device 10.

In the example of FIG. 1, the processor device 14 executes a code editor 20, which provides text editing and other functionality relevant to code development. In some examples, the code editor 20 may comprise Microsoft Visual Studio (VS) Code. The code editor 20 provides a plurality of commands 22(0)-22(C), each of which may be executed to access the native functionality provided by the code editor 20 and/or the functionality of a code editor extension of the code editor 20. The plurality of commands 22(0)-22(C) may include code editor commands for opening, saving, and closing files, modifying the contents of a file, and/or accessing a terminal window, as non-limiting examples. The code editor 20 also provides an Application Programming Interface (API) 24, which defines a common interface through which third-party code editor extensions may access the plurality of commands 22(0)-22(C). When executed by the processor device 14, the code editor 20 generates and displays a code editor interface 26 using the display device 16. The code editor interface 26 may provide one or more text editing windows, menus, buttons, and the like, through which a user may access the functionality of the code editor 20.

To provide code editor documentation pages using a lightweight text formatting language and platform-agnostic command links, the code editor 20 provides a documentation code editor extension 28. The documentation code editor extension 28 is configured to cause a documentation page 30, which is defined using a lightweight text formatting language, to be rendered as HTML within the code editor interface 26. In some examples, the documentation page 30 may be defined using Markdown or AsciiDoc, as non-limiting examples, and may be stored as part of the documentation code editor extension 28 or as a separate file (not shown) alongside the documentation code editor extension 28. The documentation page 30 in some examples may be displayed within a webview provided by the code editor interface 26.

The documentation page 30 rendered within the code editor interface 26 includes one or more platform-agnostic command links 32(0)-32(P). Each of the platform-agnostic command links 32(0)-32(P) is selectable by a user via the user input device 18. When the user selects a platform-agnostic command link 32(0)-32(P), the selection in some examples may be detected by the documentation code editor extension 28 using a custom click event handler 34. In response to the user selection, the documentation code editor extension 28 parses the selected platform-agnostic command link 32(0)-32(P), and, based on the parsing, accesses the API 24 to initiate execution of a corresponding command of the commands 22(0)-22(C) of the code editor 20 (or an extension thereof). The structure and content of the platform-agnostic command links 32(0)-32(P) is discussed in greater detail below with respect to FIGS. 3A and 3B. After executing the corresponding command 22(0)-22(C), feedback to the user may be provided by a user feedback message 36 displayed within the code editor interface 26. In some examples, the user feedback message 36 may be generated and displayed using dynamic HTML.

Figure 2:
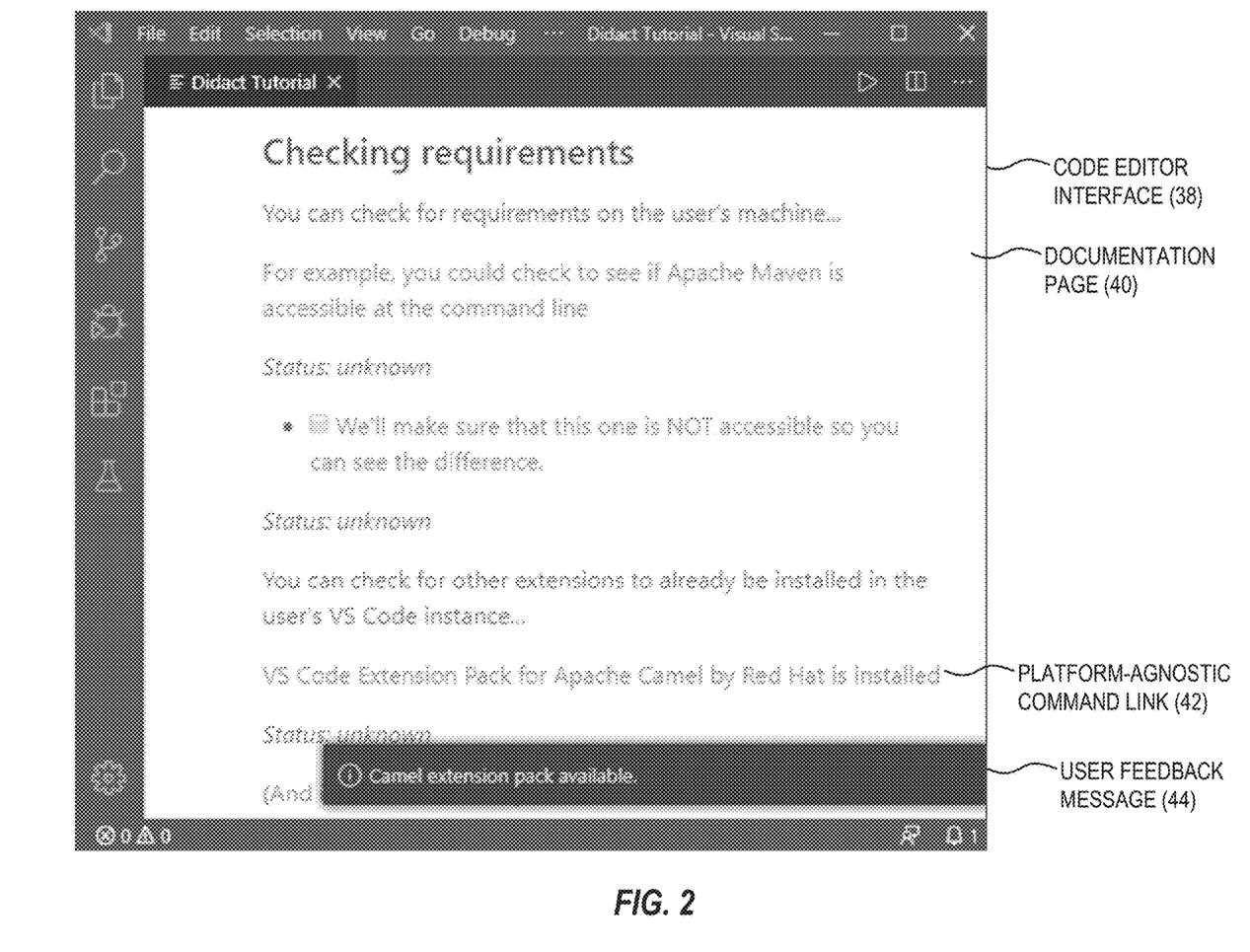
FIG. 2 is an illustration of a code editor interface and elements thereof, according to one example.

To illustrate an exemplary code editor interface and contents thereof according to one example, FIG. 2 is provided. In FIG. 2, a code editor interface 38 is provided by the code editor Microsoft VS Code, and corresponds in functionality to the code editor interface 26 of FIG. 1. The VS Code code editor interface 38 displays a documentation page 40, which is generated by a VS Code documentation code editor extension known as Didact, and which corresponds in functionality to the documentation page 30 of FIG. 1. The area of the code editor interface 38 in which the documentation page 40 is displayed may comprise a VS Code webview, as a non-limiting example. The documentation page 40 is defined by a lightweight text formatting language such as Markdown or AsciiDoc, and is rendered as HTML within the code editor interface 38. The documentation page 40 may include text, images, and/or HTML elements such as buttons, checkboxes, and/or radio buttons, as non-limiting examples.

The documentation page 40 further includes a platform-agnostic command link 42, which corresponds in functionality to the platform-agnostic command links 32(0)-32(P) of FIG. 1. When a user clicks on the platform-agnostic command link 42, the Didact documentation code editor extension parses the platform-agnostic command link 42, and then uses an API provided by VS Code to initiate a command corresponding to the platform-agnostic command link 42. In the example of FIG. 2, the Didact documentation code editor extension initiates execution of a VS Code command to determine whether the VS Code Extension Pack for Apache Camel is installed. Upon completion of the VS Code command, the Didact documentation code editor extension displays a user feedback message 44, corresponding in functionality to the user feedback message 36 of FIG. 1, to inform the user of the outcome of executing the VS Code command.

Figure 3A:
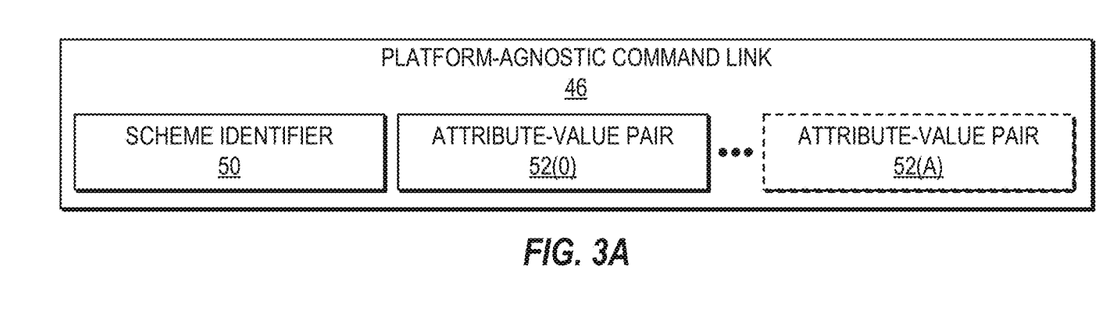
FIGS. 3A and 3B are block diagrams illustrating in greater detail the constituent elements of the platform-agnostic command links of FIG. 1.
Figure 3B:
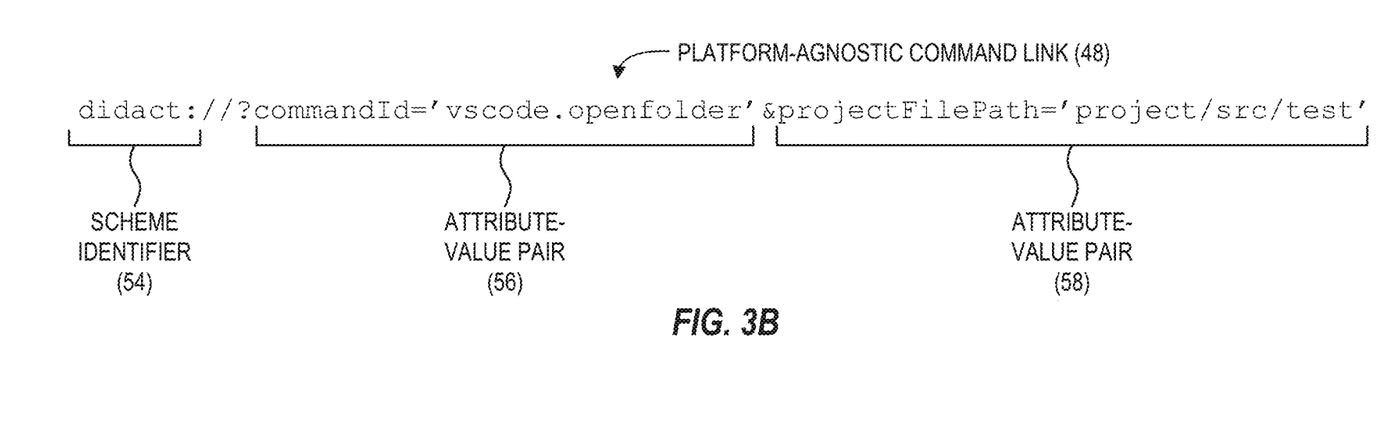

As noted above, the platform-agnostic command links 32(0)-32(P) of FIG. 1 are considered "platform-agnostic" in the sense that the functionality of the platform-agnostic command links 32(0)-32(P) is the same across all computing platforms on which the code editor 20 is supported. To accomplish this, the platform-agnostic command links 32(0)-32(P) of FIG. 1 are structured according to a predefined syntax that enables the documentation code editor extension 28 to identify and initiate execution of the commands 22(0)-22(C) corresponding to the platform-agnostic command links 32(0)-32(P). In this regard, FIG. 3A illustrates the syntax of an exemplary platform-agnostic command link 46, while FIG. 3B illustrates the actual content of an exemplary platform-agnostic command link 48 according to the syntax used by the Didact documentation code editor extension. It is to be understood that the platform-agnostic command links 46 and 48 correspond in functionality to the platform-agnostic command links 32(0)-32(P) of FIG. 1.

As seen in FIG. 3A, the platform-agnostic command link 46 comprises a scheme identifier 50 and one or more attribute-value pairs 52(0)-52(A). The scheme identifier 50 is analogous to a conventional Uniform Resource Identifier (URI) scheme identifier, and provides a unique identification of the source of the platform-agnostic command link (i.e., a code editor extension such as the documentation code editor extension 28 of FIG. 1). The one or more attribute-value pairs 52(0)-52(A) each provides an attribute and a corresponding value, and may specify, as non-limiting examples, a command, a project file path, a source file path, an extension file path, a completion message, an error message, a command text input, or a user-provided text input.

The platform-agnostic command link 48 in FIG. 3B follows the syntax illustrated in FIG. 3A, and thus comprises a scheme identifier 54 and two attribute-value pairs 56 and 58. The scheme identifier 54 is "didact://," which indicates that processing of the platform-agnostic command link 48 is handled by the Didact documentation code editor extension discussed above with respect to FIG. 2. Each of the attribute-value pairs 56 and 58 provides data necessary for the Didact documentation code editor extension to identify and initiate execution of a corresponding VS Code command. In the example of FIG. 3B, the attribute-value pair 56 comprises the attribute "commandID" and the value "vscode.openfolder," which indicates that the platform-agnostic command link 48, when selected by a user, will cause the VS Code command "Open Folder" to be initiated. The attribute-value pair 58 comprises the attribute "projectFilePath" and the value "project/src/test," and represents a parameter to be used in executing the "Open Folder" command.

Figure 4:
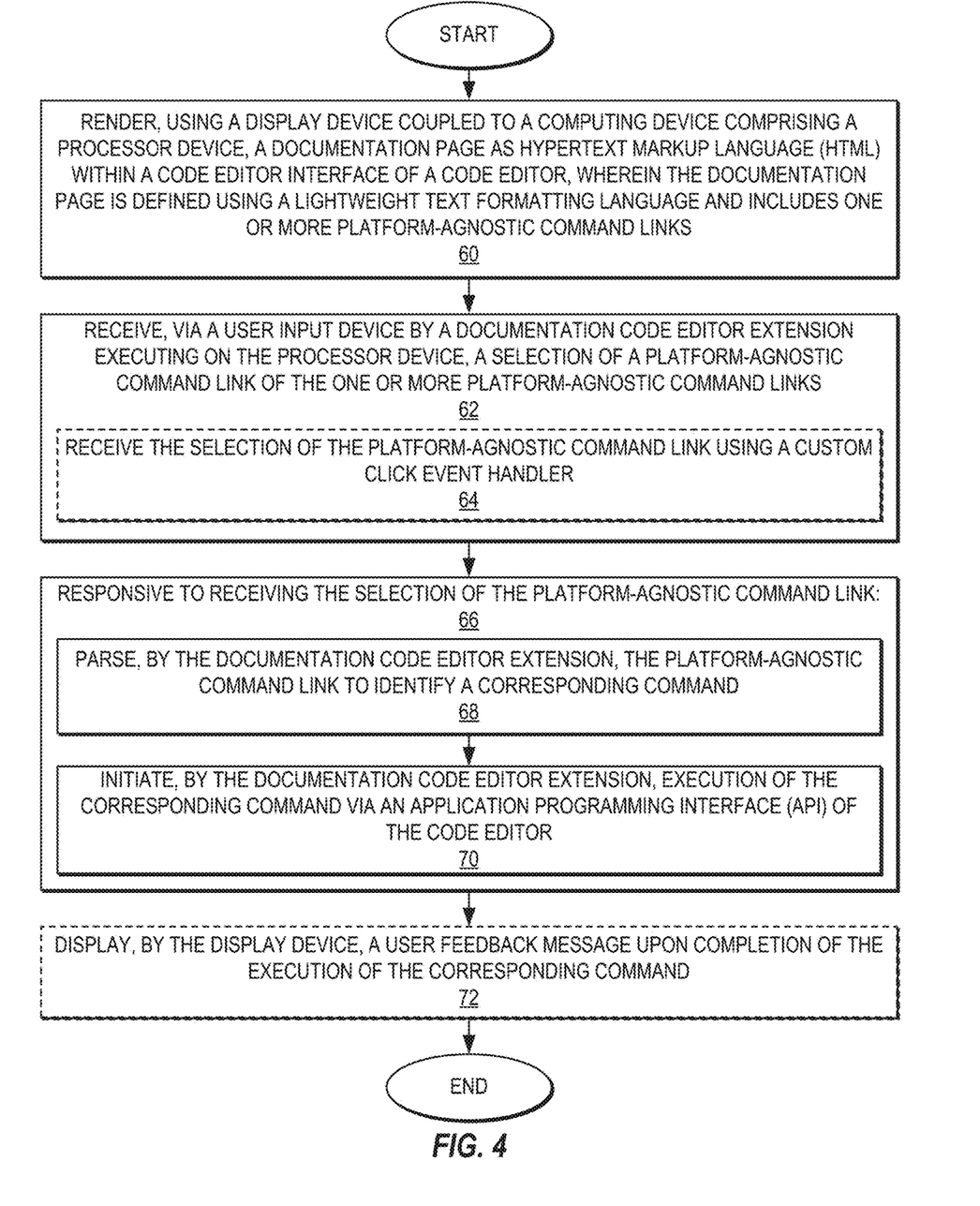
FIG. 4 is a flowchart illustrating operations for providing code editor documentation pages using a lightweight text formatting language and platform-agnostic command links, according to one example.

FIG. 4 is a flowchart of a method for providing code editor documentation pages using a lightweight text formatting language and platform-agnostic command links according to one example. For the sake of clarity, elements of FIG. 1 are referenced in describing the operations of FIG. 4. Operations in FIG. 4 begin with the documentation code editor extension 28 of FIG. 1 rendering, using the display device 16 coupled to the computing device 10 comprising the processor device 14, the documentation page 30 as Hypertext Markup Language (HTML) within the code editor interface 26 of the code editor 20, wherein the documentation page 30 is defined using a lightweight text formatting language and includes one or more platform-agnostic command links 32(0)-32(P) (block 60). The documentation code editor extension 28 next receives, via the user input device 18, a selection of a platform-agnostic command link, such as the platform-agnostic command link 32(0), of the one or more platform-agnostic command links 32(0)-32(P) (block 62). In some examples, operations of block 62 for receiving the selection of the platform-agnostic command link 32(0) may comprise receiving the selection of the platform-agnostic command link 32(0) using the custom click event handler 34 (block 64).

In response to receiving the selection of the platform-agnostic command link 32(0), the documentation code editor extension 28 performs a series of operations, as indicated by block 66. The documentation code editor extension 28 parses the platform-agnostic command link 32(0) to identify a corresponding command, such as the command 22(0) of the commands 22(0)-22(C) (block 68). The documentation code editor extension 28 then initiates execution of the corresponding command 22(0) via the API 24 of the code editor 20 (block 70). According to some examples, the documentation code editor extension 28 further displays, using the display device 16, the user feedback message 36 upon completion of the execution of the corresponding command 22(0) (block 72).

Figure 5:
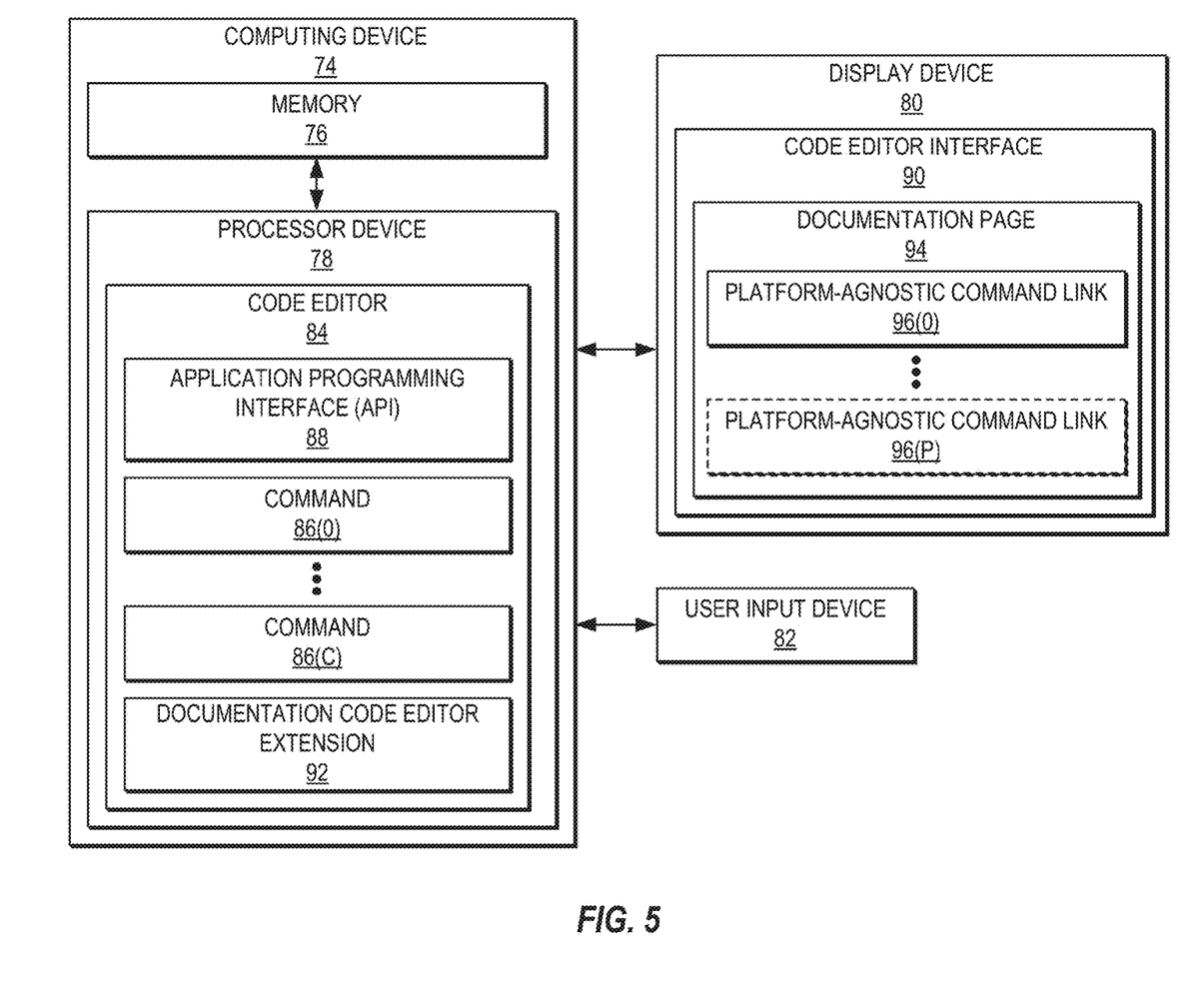
FIG. 5 is a simpler block diagram of the computing device of FIG. 1 for providing code editor documentation pages using a lightweight text formatting language and platform-agnostic command links, according to one example.

To illustrate a simplified diagram of the computing device 10 illustrated in FIG. 1 according to another example, FIG. 5 is provided. In FIG. 5, a computing device 74 comprises a memory 76 and a processor device 78. The computing device 74 is communicatively coupled to a display device 80 such as a monitor, a cathode ray tube (CRT) display, or the like, as non-limiting examples. The computing device 74 is also communicatively coupled to a user input device 82, such as a keyboard, a mouse, a trackpad, and/or the like, as non-limiting examples. While the display device 80 and the user input device 82 are illustrated in FIG. 5 as elements separate from the computing device 74, it is to be understood that in some examples the display device 80 and the user input device 82 may be physically integrated into the computing device 74.

As seen in FIG. 5, the processor device executes a code editor 84, which provides text editing and other functionality relevant to code development. The code editor 84 provides a plurality of commands 86(0)-86(C), each of which may be executed to access the native functionality provided by the code editor 84 and/or the functionality of a code editor extension of the code editor 84. The code editor 84 also provides an API 88, which defines a common interface through which third-party code editor extensions may access the plurality of commands 86(0)-86(C). When executed by the processor device 78, the code editor 84 generates and displays a code editor interface 90 using the display device 80.

To provide code editor documentation pages using a lightweight text formatting language and platform-agnostic command links, the code editor 84 provides a documentation code editor extension 92. The documentation code editor extension 92 causes a documentation page 94, which is defined using a lightweight text formatting language, to be rendered as HTML within the code editor interface 90. The documentation page 94 rendered within the code editor interface 90 includes one or more platform-agnostic command links 96(0)-96(P). Each of the platform-agnostic command links 96(0)-96(P) is selectable by a user via the user input device 82. When the user selects a platform-agnostic command link 96(0)-96(P), the documentation code editor extension 92 parses the selected platform-agnostic command link 96(0)-96(P), and, based on the parsing, accesses the API 88 to initiate execution of a corresponding command of the commands 86(0)-86(C) of the code editor 84.

Figure 6:
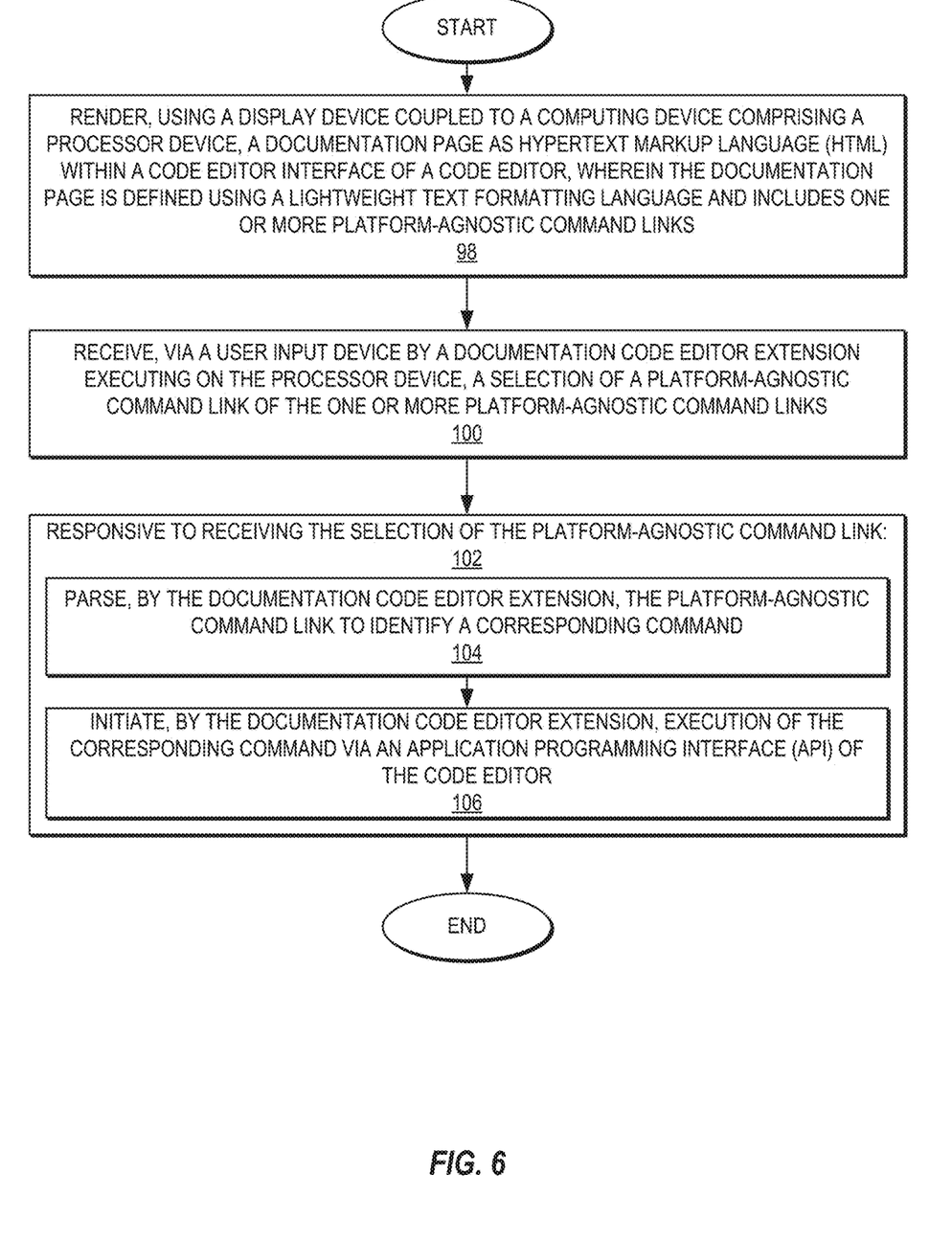
FIG. 6 is a flowchart of a simplified method for providing code editor documentation pages using a lightweight text formatting language and platform-agnostic command links, according to one example.

FIG. 6 is a flowchart of a simplified method providing code editor documentation pages using a lightweight text formatting language and platform-agnostic command links according to one example. Elements of FIG. 5 are referenced in describing the operations of FIG. 6 for the sake of clarity. In FIG. 6, operations begin with the documentation code editor extension 92 of FIG. 5 rendering, using the display device 80 coupled to the computing device 74 comprising the processor device 78, the documentation page 94 as Hypertext Markup Language (HTML) within the code editor interface 90 of the code editor 84, wherein the documentation page 94 is defined using a lightweight text formatting language and includes one or more platform-agnostic command links 96(0)-96(P) (block 98). The documentation code editor extension 92 next receives, via the user input device 82, a selection of a platform-agnostic command link, such as the platform-agnostic command link 96(0) of the one or more platform-agnostic command links 96(0)-96(P) (block 100).

In response to receiving the selection of the platform-agnostic command link 96(0), the documentation code editor extension 92 performs a series of operations, as indicated by block 102. The documentation code editor extension 92 parses the platform-agnostic command link 96(0) to identify a corresponding command, such as the command 86(0) of the commands 86(0)-86(C) (block 104). The documentation code editor extension 92 then initiates execution of the corresponding command 86(0) via the API 88 of the code editor 84 (block 106).

Figure 7:
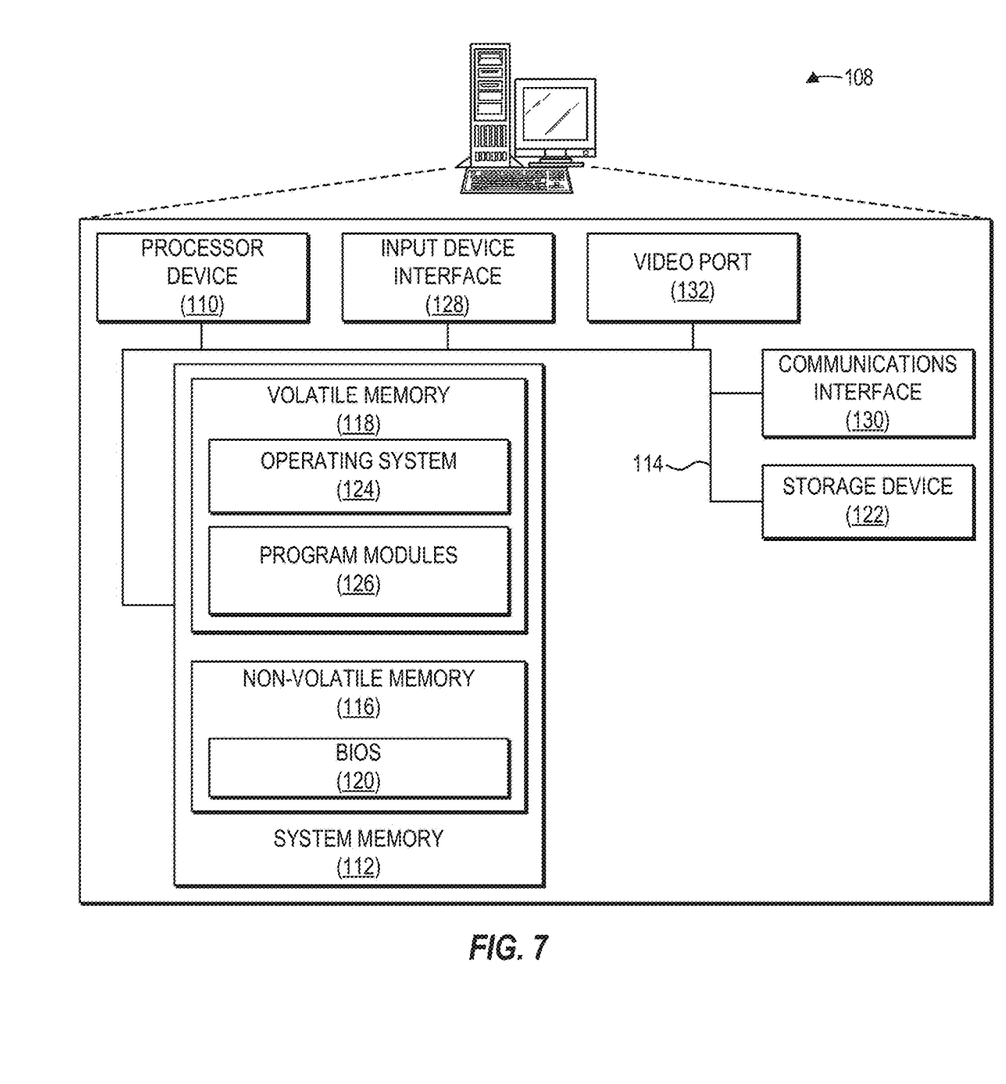
FIG. 7 is a block diagram of a computing device suitable for implementing examples, according to one example.

FIG. 7 is a block diagram of a processor-based computing device 108 ("computing device 108"), such as the computing device 10 of FIG. 1 or the computing device 74 of FIG. 6, suitable for implementing examples according to one example. The computing device 108 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 108 includes a processor device 110, a system memory 112, and a system bus 114. The system bus 114 provides an interface for system components including, but not limited to, the system memory 112 and the processor device 110. The processor device 110 can be any commercially available or proprietary processor.

The system bus 114 may be any of several types of bus structures that may further interconnect to a memory bus (with or without a memory controller), a peripheral bus, and/or a local bus using any of a variety of commercially available bus architectures. The system memory 112 may include non-volatile memory 116 (e.g., read-only memory (ROM), erasable programmable ROM (EPROM), electrically EPROM (EEPROM), etc.), and volatile memory 118 (e.g., RAM). A basic input/output system (BIOS) 120 may be stored in the non-volatile memory 116 and can include the basic routines that help to transfer information among elements within the computing device 108. The volatile memory 118 may also include a high-speed RAM, such as static RAM, for caching data.

The computing device 108 may further include or be coupled to a non-transitory computer-readable storage medium such as a storage device 122, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 122 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 122 and in the volatile memory 118, including an operating system 124 and one or more program modules 126 which may implement the functionality described herein in whole or in part. It is to be appreciated that the examples can be implemented with various commercially available operating systems 124 or combinations of operating systems 124. All or a portion of the examples may be implemented as a computer program product stored on a transitory or non-transitory computer-usable or computer-readable storage medium, such as the storage device 122, which includes complex programming instructions, such as complex computer-readable program code, to cause the processor device 110 to carry out the steps described herein. Thus, the computer-readable program code can comprise software instructions for implementing the functionality of the examples described herein when executed on the processor device 110. The processor device 110 may serve as a controller, or control system, for the computing device 108 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 110 through an input device interface 128 that is coupled to the system bus 114 but can be connected by other interfaces, such as a parallel port, an Institute of Electrical and Electronic Engineers (IEEE) 13110 serial port, a Universal Serial Bus (USB) port, an IR interface, and the like.

The computing device 108 may also include a communications interface 130 suitable for communicating with a network as appropriate or desired. The computing device 108 may also include a video port 132 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method for providing code editor documentation pages using a lightweight text formatting language and platform-agnostic command links, comprising:
rendering, using a display device coupled to a computing device comprising a processor device, a documentation page for a code editor or a code editor extension as Hypertext Markup Language (HTML) within a code editor interface of the code editor, wherein the documentation page is defined using a lightweight text formatting language and includes one or more platform-agnostic command links each of the platform-agnostic command links corresponding to a command of one or more commands of the code editor or the code editor extension;
receiving, via a user input device by a documentation code editor extension executing on the processor device, a selection of a platform-agnostic command link of the one or more platform-agnostic command links; and
responsive to receiving the selection of the platform-agnostic command link:
parsing, by the documentation code editor extension, the platform-agnostic command link to identify a corresponding command; and
initiating, by the documentation code editor extension, execution of the corresponding command via an application programming interface (API) of the code editor.

2. The method of claim 1, wherein each of the one or more platform-agnostic command links comprises a scheme identifier and one or more attribute-value pairs.

3. The method of claim 2, wherein the one or more attribute-value pairs specifies one or more of a command, a project file path, a source file path, an extension file path, a completion message, an error message, a command text input, and a user-provided text input.

4. The method of claim 1, wherein:
the code editor comprises Microsoft Visual Studio (VS) Code;
the API comprises a VS Code API; and
the corresponding command comprises a VS Code command.

5. The method of claim 1, wherein receiving the selection of the platform-agnostic command link comprises receiving the selection of the platform-agnostic command link using a custom click event handler.

6. The method of claim 1, wherein the lightweight text formatting language comprises one of Markdown and AsciiDoc.

7. The method of claim 1, further comprising displaying, using the display device, a user feedback message upon completion of the execution of the corresponding command.

8. A computing device, comprising:
a memory; and
a processor device coupled to the memory to:
render, using a display device, a documentation page for a code editor or a code editor extension as Hypertext Markup Language (HTML) within a code editor interface of the code editor, wherein the documentation page is defined using a lightweight text formatting language and includes one or more platform-agnostic command links each of the platform-agnostic command links corresponding to a command of one or more commands of the code editor or the code editor extension;
receive, via a user input device using a documentation code editor extension, a selection of a platform-agnostic command link of the one or more platform-agnostic command links; and
responsive to receiving the selection of the platform-agnostic command link:
parse, using the documentation code editor extension, the platform-agnostic command link to identify a corresponding command; and
initiate, using the documentation code editor extension, execution of the corresponding command via an application programming interface (API) of the code editor.

9. The computing device of claim 8, wherein each of the one or more platform-agnostic command links comprises a scheme identifier and one or more attribute-value pairs.

10. The computing device of claim 9, wherein the one or more attribute-value pairs specifies one or more of a command, a project file path, a source file path, an extension file path, a completion message, an error message, a command text input, and a user-provided text input.

11. The computing device of claim 8, wherein:
the code editor comprises Microsoft Visual Studio (VS) Code;
the API comprises a VS Code API; and
the corresponding command comprises a VS Code command.

12. The computing device of claim 8, wherein to receive the selection of the platform-agnostic command link is to receive the selection of the platform-agnostic command link using a custom click event handler.

13. The computing device of claim 8, wherein the lightweight text formatting language comprises one of Markdown and AsciiDoc.

14. The computing device of claim 8, wherein the processor device is further to display, using the display device, a user feedback message upon completion of the execution of the corresponding command.

15. A computer program product stored on a non-transitory computer-readable storage medium and including instructions to cause a processor device to:
render, using a display device, a documentation page of a code editor or a code editor extension as Hypertext Markup Language (HTML) within a code editor interface of a code editor, wherein the documentation page is defined using a lightweight text formatting language and includes one or more platform-agnostic command links each of the platform-agnostic command links corresponding to a command of one or more commands of the code editor or the code editor extension;
receive, via a user input device using a documentation code editor extension, a selection of a platform-agnostic command link of the one or more platform-agnostic command links; and
responsive to receiving the selection of the platform-agnostic command link:
parse, using the documentation code editor extension, the platform-agnostic command link to identify a corresponding command; and
initiate, using the documentation code editor extension, execution of the corresponding command via an application programming interface (API) of the code editor.

16. The computer program product of claim 15, wherein each of the one or more platform-agnostic command links comprises a scheme identifier and one or more attribute-value pairs.

17. The computer program product of claim 16, wherein the one or more attribute-value pairs specifies one or more of a command, a project file path, a source file path, an extension file path, a completion message, an error message, a command text input, and a user-provided text input.

18. The computer program product of claim 15, wherein:
the code editor comprises Microsoft Visual Studio (VS) Code;
the API comprises a VS Code API; and
the corresponding command comprises a VS Code command.

19. The computer program product of claim 15, wherein to receive the selection of the platform-agnostic command link is to receive the selection of the platform-agnostic command link using a custom click event handler.

20. The computer program product of claim 15, wherein the lightweight text formatting language comprises one of Markdown and AsciiDoc.

\* \* \* \* \*